(12) United States Patent
Flores et al.

(10) Patent No.: US 7,987,030 B2
(45) Date of Patent: Jul. 26, 2011

(54) VEHICLE ILLUMINATION SYSTEM AND METHOD

(75) Inventors: Patricia A. Flores, Clawson, MI (US); Adrian B. Chernoff, Boulder, CO (US)

(73) Assignee: GM Global Technology Operations LLC, Detroit, MI (US)

( * ) Notice: Subject to any disclaimer, the term of this patent is extended or adjusted under 35 U.S.C. 154(b) by 1228 days.

(21) Appl. No.: 11/436,786

(22) Filed: May 18, 2006

(65) Prior Publication Data

US 2006/0271261 A1 Nov. 30, 2006

Related U.S. Application Data

(60) Provisional application No. 60/684,440, filed on May 25, 2005.

(51) Int. Cl.
*B60Q 1/00* (2006.01)
(52) U.S. Cl. .......... 701/36; 701/301; 340/435; 340/438; 340/901
(58) Field of Classification Search ............ 701/36, 701/116, 301; 307/10.8; 340/435, 436, 438, 340/961, 901, 903
See application file for complete search history.

(56) References Cited

U.S. PATENT DOCUMENTS

| 5,929,786 A * | 7/1999 | Schofield et al. ............. 340/903 |
| 7,602,278 B2 * | 10/2009 | Prost-Fin et al. ............. 340/438 |
| 2006/0070795 A1 * | 4/2006 | Meissner ...................... 180/446 |

FOREIGN PATENT DOCUMENTS

WO WO2004/091994 * 10/2004

OTHER PUBLICATIONS

Prost-Fin et al, Provisional Application No. 60/644575, Steering Wheel, Jan. 19, 2005.*

* cited by examiner

*Primary Examiner* — Khoi Tran
*Assistant Examiner* — Spencer Patton
(74) *Attorney, Agent, or Firm* — Quinn Law Group, PLLC

(57) ABSTRACT

An apparatus and method for illuminating a vehicle including a light source connected to an illuminatable component such as an interior or exterior vehicle door handle or steering wheel, and a control system including a plurality of sensors that monitor the vehicle and surroundings for predetermined conditions and selectively illuminate the component as a means of conveying information or warnings about the vehicle or its surroundings. Illumination may be enhanced by other auditory signals such as audio alarms or vibration. Predetermined conditions may include the proximity of a vehicle user, key fob activation or proximity, input from an entertainment system, activation of a pressure sensor, the presence of a person or object in proximity to the vehicle, or the vehicle's ignition or gear state.

5 Claims, 3 Drawing Sheets

VEHICLE ILLUMINATION SYSTEM AND METHOD

CROSS REFERENCE TO RELATED APPLICATION

This application claims the benefit of U.S. Provisional Application 60/684,440, filed May 25, 2005.

TECHNICAL FIELD

This invention relates to the control of vehicle components having a light source configured to transmit light to the components.

BACKGROUND OF THE INVENTION

It is well known in the art to provide vehicle components that are lighted in some manner, both exterior and interior. For example, it has been shown in the prior art that certain interior components can be lighted as part of the interior lighting with lighted components in the instrument panel or instrument panel cluster, armrest, headliner, shift handle, door handles, grab handles, and other portions of the doors. It is also known in the prior art to provide back-lighted components such as by providing a translucent or at least partially non-opaque surface such as in any of the aforementioned interior components as well as control switches, a steering wheel or an air bag cover backlit with an LED. Other lighting techniques known in the prior art include the provision of opaque interior components that may be made of a phosphorescent material selectively illuminated by black light. In addition, many interior components may be lit by using light pipes, bulbs, fiber optics, electroluminescent film, and any other sort of traditional lighting methods.

Typically, the lighting of these interior vehicle components is controlled either by entering or exiting the vehicle, for example, opening the door or utilizing a key fob or manual switch.

SUMMARY OF THE INVENTION

A component for a vehicle is provided. A suitable light source, such as a light-emitting diode (LED), is connected to the component such that the light source selectively illuminates or transmits light into the component. The component is preferably non-opaque, i.e., exhibits some degree of translucency or transparency, and thus the component illuminates or transmits the light from the light source such that the light exits the exterior surface of the component.

A control system controls the light source so that the component is illuminated in response to the existence of certain predetermined conditions. For example, the control system may cause the light source to illuminate the component when conditions exist that indicate that a vehicle occupant or user is about to use the component. The control system may also cause the light source to illuminate the component as a means of conveying information about the vehicle or its surroundings.

A method in accordance with this invention further avoids interference with other objects, usually vehicles, which are moving in proximity to the vehicle of this invention, such as in an adjacent highway lane, by selectively illuminating a portion of the component in proportion to at least one of the location, proximity, and size of the other objects or vehicles. Under certain conditions, illumination may be enhanced by changes in color and/or intensity, by strobing, or by other sensory alarms such as audio alarms or vibration.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
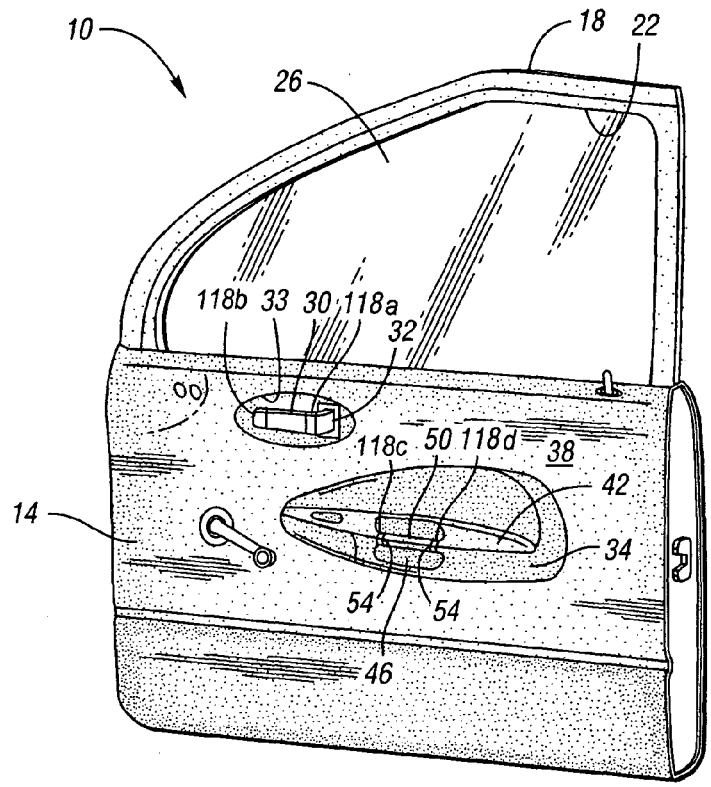
FIG. 1 is a schematic side view of a vehicle door with an interior trim panel.

Referring to FIG. 1, a vehicle door 10 is schematically depicted. The vehicle door 10 has an interior trim panel 14 thereon, which is connected to a door inner panel (not shown) as understood by those skilled in the art. The door also includes a window frame 18 that defines a window opening 22. A glass window 26 is shown in the window opening 22, and is selectively retractable into a cavity at least partially formed by the inner panel.

The interior trim panel 14 is exposed to the vehicle passenger compartment and defines a portion of the vehicle's interior. An inside door handle 30 is selectively pivotable about a vertical axis adjacent one end 32 of the handle 30, and is operatively connected to a door latch (not shown) as understood by those skilled in the art such that the door latch releases a striker (not shown) on the vehicle body thereby to allow the door to open. The inside handle 30 is partially disposed within a recess 33 in the interior trim panel 14. The trim panel 14 includes a protrusion 34 that protrudes from generally vertical interior trim surface 38. The protrusion 34 includes a generally horizontal surface 42 that functions as an armrest. The protrusion 34 also defines a cavity 46 that interrupts a portion of the horizontal surface 42 and extends downward therefrom. A pull handle 50 has two opposing ends 54, each end 54 being connected to the trim panel 14 such that the pull handle extends across the cavity 46.

Figure 2:
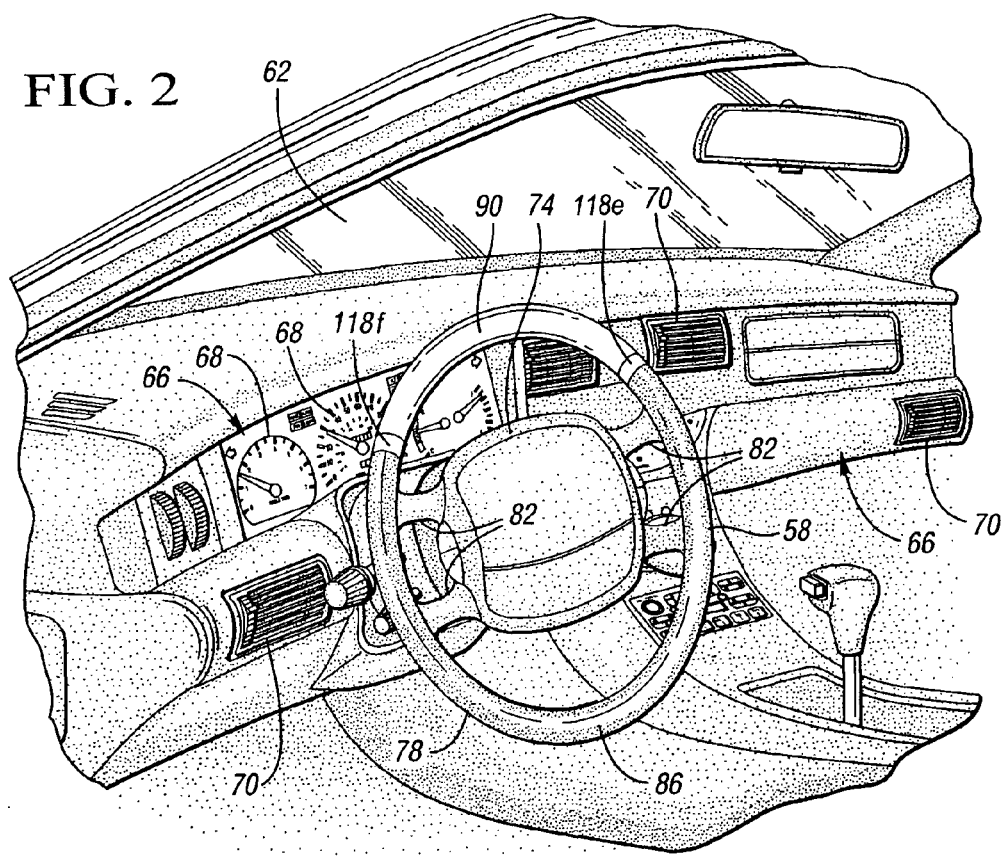
FIG. 2 is a schematic view of a portion of a vehicle interior, including a steering wheel.

Referring to FIG. 2, a vehicle steering wheel 58 is depicted in the interior of a vehicle. The steering wheel 58 is rearward of a windshield 62 and an instrument panel 66. The instrument panel 66 of FIG. 2 includes gauges 68 for conveying vehicle information to a vehicle driver, such as vehicle speed and coolant temperature. The instrument panel 66 also defines vents 70 for heating, ventilation, and air conditioning. The steering wheel 58 includes a hub 74 and a generally circular ring 78 connected to the hub 74 by spokes 82. The ring includes a first portion 86 and a second portion 90.

Figure 3:
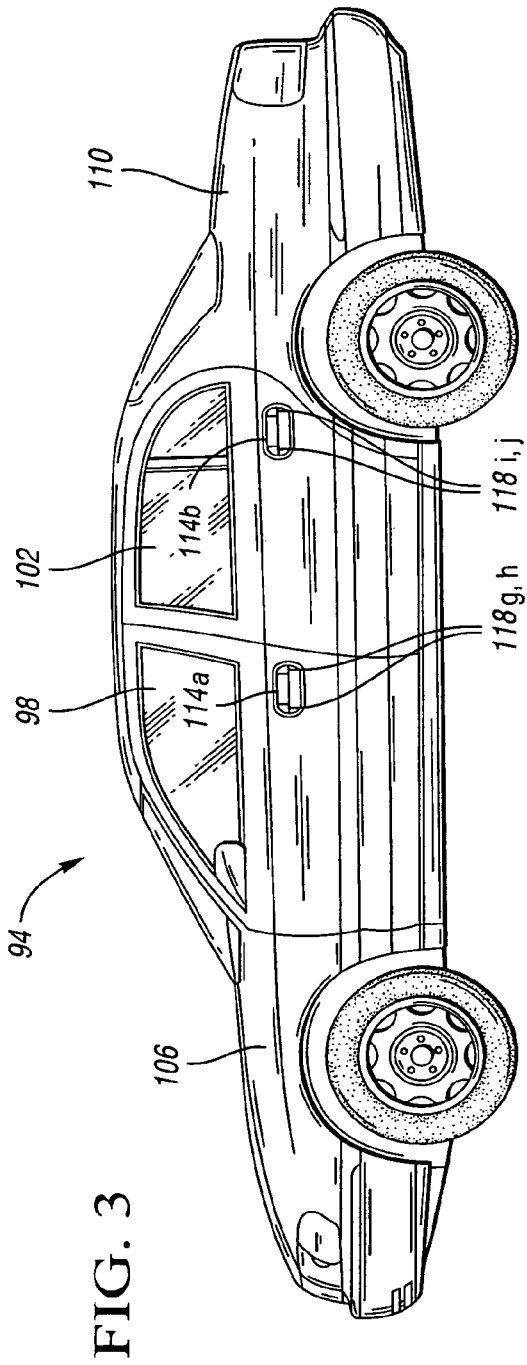
FIG. 3 is a schematic side view of an automotive vehicle including front and rear side doors.

Referring to FIG. 3, a vehicle 94 includes a front door 98 and a rear door 102 between a front fender 106 and a rear quarter panel 110. The front and rear doors 98, 102 each includes a respective outside door handle 114a, 114b operable to release a latch (not shown) to enable the door to open. The doors 98, 102 are substantially similar to the door shown at 10 in FIG. 1.

Referring to FIGS. 1-3, the inside door handle 30, the pull handle 50, the portion 90 of the steering wheel, and the outside door handles 114a, 114b are formed of a non-opaque material, i.e., a material permitting illumination or the transmission of at least some light therethrough. Thus, the handles 30, 50, 114a, 114b and the steering wheel portion 90 exhibit some degree or proportion of transparency or translucency. Those skilled in the art will recognize a variety of materials that may be employed to fabricate the handles 30, 50, 114a, 114b and steering wheel portion 90 to provide translucence or transparence, such as polycarbonate, acrylic, etc. The handles 30, 50, 114a, 114b, and the steering wheel portion 90 may include an opaque member surrounded by a transparent or translucent material, such as certain resins or thermoplastics, within the scope of the claimed invention.

Referring again to FIG. 1, two light sources 118a, 118b are connected to opposite ends of the inside door handle 30. Within the scope of the claimed invention, light sources that are integrally molded into a handle or steering wheel are "connected" to the handle or steering wheel. Two light sources 118c, 118d are also connected to opposite ends of the pull handle 50. Each light source 118a-d is configured to selectively illuminate or transmit light into a corresponding one of the handles 30, 50 such that the handle 30, 50 illuminates or transmits the light through its exterior surface to appear luminous, independent of ambient light within the passenger compartment. Although two light sources 118a, 118b and 118c, 118d are connected to each handle 30, 50, respectively, it should be noted that one or more light sources may be connected to a handle or another vehicle component such as an interior trim or exterior part within the scope of the claimed invention.

Referring again to FIG. 2, the second portion 90 of the steering wheel 58 is at least partially non-opaque, i.e., exhibits some degree or proportion of translucence or transparence. The steering wheel 58 includes light sources 118e, 118f configured to transmit light into opposing ends of portion 90 such that portion 90 transmits the light to the passenger compartment through its exterior surface to appear luminous, independent of ambient light within the passenger compartment. It will further be appreciated that the entire ring of the steering wheel 58 or a non-rotating interior portion or part of the steering wheel 58 could also be selectively illuminated in accordance with the control system described further below.

Referring to FIG. 3, each of the outside door handles 114a, 114b has two light sources 118g, 118h and 118i, 118j, respectively connected thereto, each light source 118g-j is configured to selectively illuminate or transmit light into the handle 114a, 114b at one end of the handle 114a, 114b such that the light from each of light sources 118g-j is transmitted through the handle 114a, 114b so that the handle appears luminous independent of ambient light.

Referring to FIGS. 1-3, exemplary light sources 118a-j include light-emitting diodes (LEDs), electroluminescent lighting, incandescent lights, etc. LEDs could be employed individually or as part of a color-phasing LED array. Within the scope of the claimed invention, a "light source" may be any source of light, including elements that merely transmit light from a remote light source. Thus, for example, light sources 118a-j may be fiber optic cables that transmit light into the handles 30, 50, 114a, 114b or steering wheel portion 90 from another light source such as an LED. The light sources 118a-j are preferably connected to the handles or steering wheel portion such that there is no perceptible leakage of light, i.e., so that substantially no light from the light source is perceptible to an observer without first being transmitted through the handle or steering wheel portion. When electroluminescent lighting is employed, it may be desirable for the electroluminescent material to be molded, or otherwise integrated to, a handle or other non-opaque part or textile such as woven or perforated fabric.

It will be appreciated that the above interior components are merely exemplary, and that other interior or exterior components—for example, exterior panels, handles, key holes, interior door panels, headliners, switches, air bag cover, instrument panel cluster, grab handles, glove box door, HVAC outlets, fabric, outside rear view mirrors—may also be lit in any suitable manner.

Figure 4:
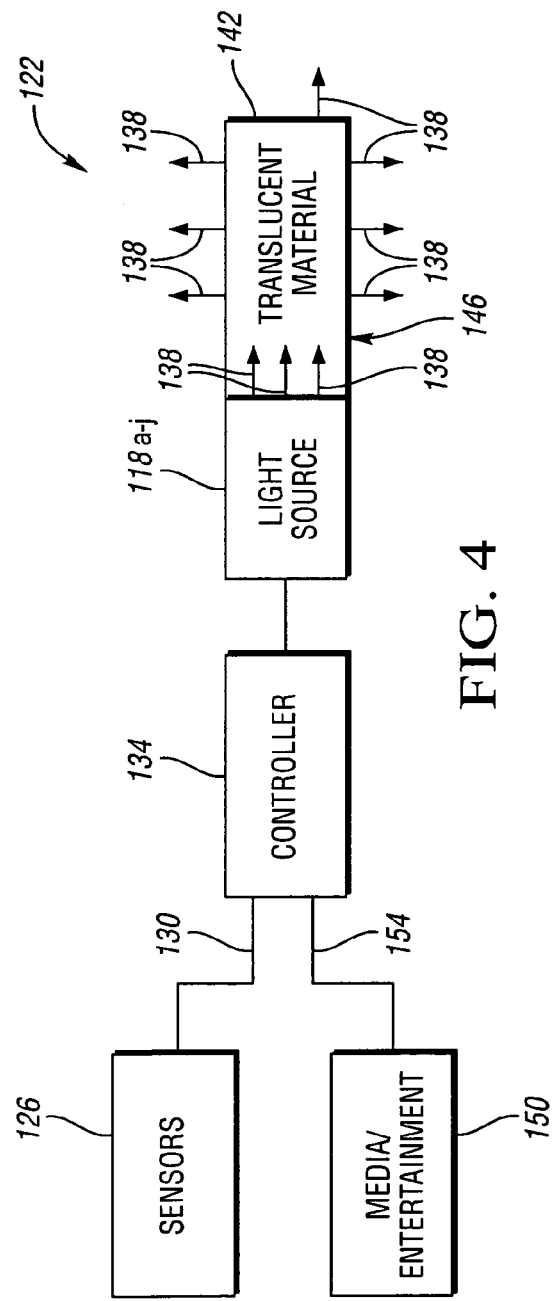
FIG. 4 is a schematic depiction of a control system for use with the steering wheel of FIG. 2 and the door handles of FIGS. 1 and 3.

Referring to FIG. 4, a control system 122 is schematically depicted. The control system 122 includes a plurality of sensors 126 that are configured to monitor vehicle conditions and to transmit signals 130 indicative of the presence or existence of the vehicle conditions to a controller 134. The controller 134 is programmed and configured to determine whether the signals 130 are indicative of the existence of predetermined conditions, and to cause the light sources 118a-j to illuminate and transmit light 138 into a light-transmitting material 142 in a degree or proportional response to the signals 130 indicating the existence of the predetermined condition. The material 142 may form any of the handles or steering wheel portion shown at 30, 50, 90, 114a, 114b in FIGS. 1-3 as well as other vehicle interior components. The material 142 transmits the light 138 therethrough such that it exits the material 142 through its exterior surface 146. Surfaces made from material 142 may also be dipped or coated in textural material to further convey information about the vehicle or its environment.

In an exemplary embodiment, a sensor 126 monitors whether a vehicle user is outside the vehicle with an intention of entering the passenger compartment, and the controller 134 is programmed to illuminate the outside door handles 114a, 114b in response to the vehicle user being outside the vehicle with an intention of entering the passenger compartment. For example, the sensor 126 may monitor whether a key fob is within a predetermined proximity to the vehicle without the user even initiating the key fob, whether a user has transmitted a signal from the key fob to unlock the doors, or the sensors 126 may detect the presence of a person within a predetermined distance of the door, such as by sensing the motion or other signal indicating the presence of a person.

Based on these signals, the controller will selectively determine when to selectively illuminate or turn the lighted components either on or off. For example, when it is sensed that the key fob is a certain distance from the vehicle, then the interior lights will turn off unless other indications are present—like the door being opened. Sensor inputs could also include, for example, vehicle presence in the seats, door positions, persons outside the vehicle, key fob location, state of ignition switch or state of gear shift, external ambient light conditions (e.g. day or night).

In another exemplary embodiment, the sensor 126 monitors whether a user is inside the passenger compartment and has an intention of leaving the vehicle. For example, the sensor 126 may monitor the position of an ignition switch, or position of gear shift, and the controller may be programmed to illuminate the inside door handle and the pull handle when the engine is turned off or when a key is removed from the ignition switch.

The controller 134 may also be operatively connected to a media and entertainment system 150, and may also cause the illumination of light source 118a-j in response to signals 154 from the media and entertainment system. For example, the light source could change color or selective illumination level or degree or even strobe, pulse, or flash according to a signal from the entertainment system. This could be used purely for entertainment and mood purposes to reflect the type of song, rhythm of the song, and could be enabled and disabled depending on the parking or driving mode of the vehicle.

In an exemplary embodiment, the color or intensity of light emitted by the light source 118a-j may be selectively varied by the controller 134 in response to the existence or presence of predetermined conditions. Alternatively, multiple light sources 118a-j may be connected to the material 142, each producing a different color, and each being individually controllable by the controller 134 to vary the color of light transmitted through the material 142 in response to the presence or existence of predetermined conditions. Material 142 may include simulated wood grain, or other geometrical patterns or textiles such as woven or perforated fabric. Grip pressure imparted to pressure transducers (not shown) located within the steering wheel 58 or elsewhere in the vehicle could signal another predetermined condition, thereby triggering various audio-visual responses, for example a greeting to the driver in the form of a lighting, vibration, and/or audio effect or message upon gripping the wheel for the first time upon vehicle entry. Vibration or audio effects are known in the art, and could take the form of simple buzzers, repeating tones, and the like.

Figure 5A:
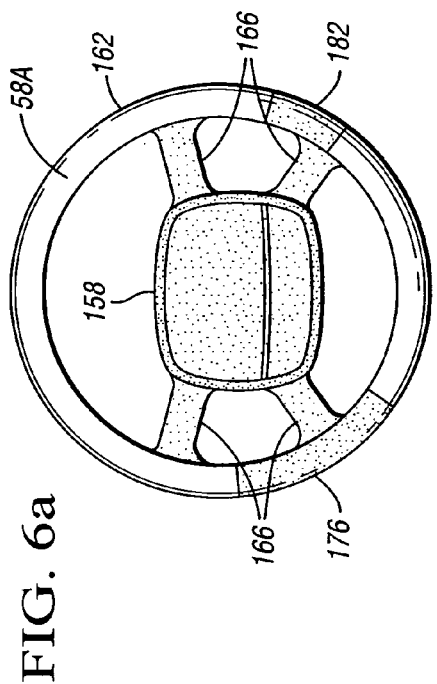
FIG. 5a is a schematic depiction of a steering wheel.
Figure 5B:
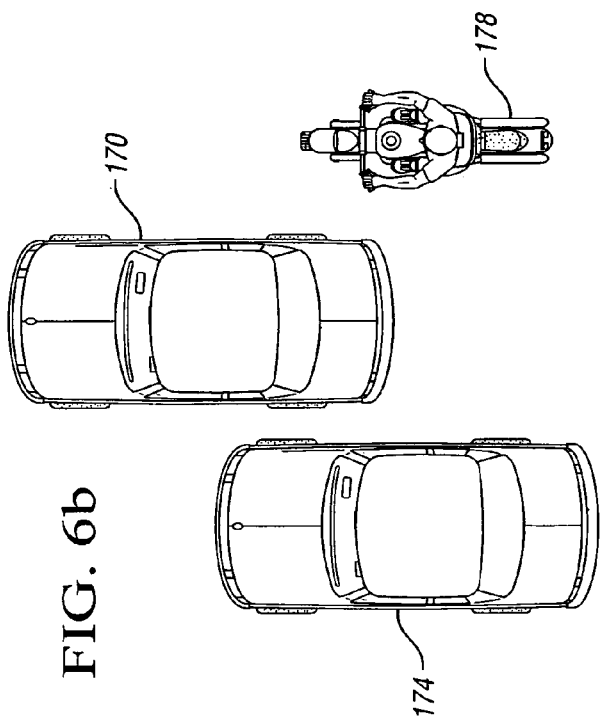
FIG. 5b is a schematic top view of the vehicle in which the steering wheel of FIG. 5a is installed.

Referring to FIG. 5a, an alternative steering wheel 58A is schematically depicted. Steering wheel 58A includes a hub 158 and a rim 162 connected to the hub 158 by spokes 166. The rim 162 includes a plurality of light sources distributed therealong. The light sources are controlled for selective illumination by a controller, such as the one shown at 134 in FIG. 4. Sensors, such as the ones shown at 126 in FIG. 4, are connected to the controller, and are configured to monitor the presence of objects within a predetermined proximity to the vehicle. The controller is configured to cause the illumination of selected light sources in response to the presence of an object within the predetermined proximity to the vehicle. The light sources selected by the controller for illumination correspond to the location of the sensed object with respect to the vehicle. FIG. 5b depicts the vehicle 170 without any objects within the predetermined proximity. Accordingly, none of the light sources in the rim 162 are illuminated in FIG. 5a.

In addition, the signals may be used to give the driver a warning as to a driving condition or other situation. For example, a portion of the steering wheel, instrument panel, air bag cover, or door panel, or interior vehicle pillar could be lit to provide a visual signal to the driver of weather conditions or an impending situation. For example, lighting effects, sounds, and/or vibration could be used at various locations within the vehicle to signal freezing temperatures or the presence of ice on the road. Also, at a slow speed for parking situations, the light location and intensity thereof could indicate the presence or location of an object that might collide with or be impacted by the vehicle. At other speeds, the lights and intensity thereof could for example indicate the direction of an object or a lane deviation, among other conditions.

Figure 6A:
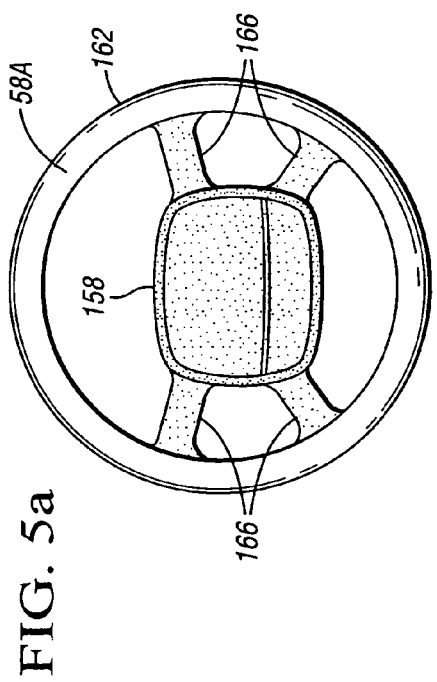
FIG. 6a is a schematic depiction of the steering wheel of FIG. 5a, with portions illuminated.
Figure 6B:
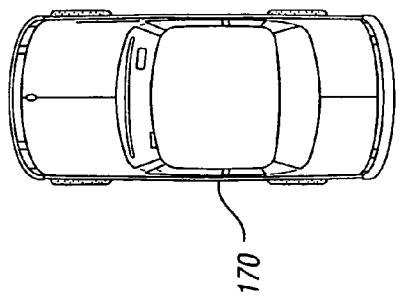
FIG. 6b is a schematic top view of the vehicle of FIG. 5b with an automobile and a motorcycle moveable in lanes adjacent thereto.

Referring to FIGS. 6a and 6b, the vehicle 170 has an object, here a vehicle 174, within the predetermined proximity and located to the left and behind the vehicle 170. Sensors indicate the presence and location of the vehicle 174 to the controller, which causes the light sources or structures to illuminate a portion 176 of the rim 162. The size, length, or intensity of portion 176 is proportional to the size and/or proximity of the vehicle 174, and the location on the rim 162 of portion 176 corresponds to the location of vehicle 174 with respect to vehicle 170. Thus, the illuminated portion 176 is on the left and lower portion of the rim 162. The location on rim 162 of portion 176 preferably automatically adjusts for wheel movement, thereby remaining properly positioned with respect to the driver regardless of steering wheel movement. The presence of motorcycle 178 causes the illumination of portion 182, which is proportional in size, length, and/or intensity to the size, length, or proximity of the motorcycle 178. The motorcycle, being on the right side and behind vehicle 170, causes portion 182 to be oriented on the right lower side of the rim 162. Alternatively, other stimuli such as strobing (e.g. turning lights on/off or varying light intensity), pulsing, vibration, and/or audio signals could be used to deliver warnings or information about the driving conditions or external environment.

Alternatively, and within the scope of the claimed invention, all of rim 162 may be selectively illuminated, with illuminatable structural portions 176 and 182 being a different color than the remainder of the rim 162. Similarly, the rim 162 may include a liquid crystal screen thereon, with portions 176 and 182 displaying a different color than the remainder of the rim 162.

The illuminatable portions 176 and 182 may be formed by discrete or discontinuous light sources, i.e., light sources that are spaced apart from one another. Furthermore, and within the scope of the claimed invention, a handle or steering wheel portion may include an opaque coating with holes therein so that light emission through the transparent or translucent material is via the holes in the opaque coating. As internal vehicle lighting effects are most effective in low ambient light, i.e. during late evening and nighttime hours, the lighting effects disclosed herein can be amplified and/or augmented based on changes in ambient light levels. Augmentation by audio and/or vibrational or other sensory effects that are insensitive to ambient light are preferred.

Other handles that may employ a non-opaque material with lights as described hereinabove may be installed as "assist handles" on, for example, A-pillars, B-pillars, C-pillars, a roof headliner above a door, or on a seatback, liftgate or trunk lid.

While the best mode for carrying out the invention has been described in detail, those familiar with the art to which this invention relates will recognize various alternative designs and embodiments for practicing the invention within the scope of the appended claims.

The invention claimed is:
1. A vehicle lighting system comprising:
a passenger compartment;
a steering wheel having a rim operatively connected to a hub, said rim being selectively illuminatable at any location around its circumference, by at least one light source in response to a detection of an obstacle in proximity to a vehicle having the system;
a controller electrically connected to said at least one light source and configured to selectively cause said at least one light source to illuminate said rim at said location, wherein said location always directly corresponds to a relative position of the obstacle with respect to the vehicle; and at least one sensor configured to monitor the proximity of said vehicle on all sides of said vehicle for the presence of said obstacle, and to transmit signals indicative of the presence of said obstacle;

the controller being configured to determine whether the transmitted signals are indicative of the presence of said obstacle and to cause the at least one light source to illuminate said rim at said location in proportional response to the signals, wherein at least one of the size and the length of an illuminated portion of said rim is substantially proportional to at least one of the size and the proximity of the obstacle;

wherein said controller automatically adjusts said location to thereby continuously display said relative position on said rim in response to a rotation of said steering wheel.

2. The lighting system of claim 1, wherein the entirety of said rim is constructed from a non-opaque material to allow said rim to be internally illuminated by said at least one light source.

3. The lighting system of claim 1, wherein at least one of the color and the intensity of the light emitted by said lighting source may be varied by the controller in response to the proximity of said obstacle.

4. The lighting system of claim 3, wherein said response includes at least one of a strobing, pulsing, a change in color, and a change in intensity.

5. The lighting system of claim 1, wherein said controller is further configured to selectively activate at least one audio or vibrational alarm in proportional response to said signals.

* * * * *